United States Patent [19]
Bedi

[11] Patent Number: 5,154,775
[45] Date of Patent: * Oct. 13, 1992

[54] INTEGRATED METHOD FOR CLEANING AND FLUSHING AN INTERNAL COMBUSTION ENGINE

[75] Inventor: Ram D. Bedi, Birmingham, Mich.

[73] Assignee: K.J. Manufacturing Co., Wixom, Mich.

[*] Notice: The portion of the term of this patent subsequent to Aug. 28, 2007 has been disclaimed.

[21] Appl. No.: 659,035

[22] Filed: Feb. 21, 1991

Related U.S. Application Data

[63] Continuation of Ser. No. 516,243, Apr. 27, 1990, Pat. No. 5,062,398.

[51] Int. Cl.[5] .............................. B08B 3/08; B08B 9/00
[52] U.S. Cl. .............................. 134/22.1; 134/22.18; 134/22.19; 134/26; 123/196 R; 184/1.5
[58] Field of Search .................. 134/22.1, 22.11, 22.12, 134/22.14, 22.18, 22.19, 42; 123/196 S, 196 R; 184/1.5

[56] References Cited

U.S. PATENT DOCUMENTS

| | | | |
|---|---|---|---|
| 3,431,145 | 11/1964 | Riley | 134/22.18 |
| 4,174,231 | 11/1979 | Hobgood | 134/22.1 X |
| 4,951,784 | 8/1990 | Bedi | 123/196 A X |
| 4,964,373 | 10/1990 | Bedi | 123/196 R |

Primary Examiner—Theodore Morris
Assistant Examiner—Saeed T. Chaudry
Attorney, Agent, or Firm—Basile and Hanlon

[57] ABSTRACT

A first pump can withdraw waste fluid from an oil pan reservoir and is used to introduce flushing fluid having a base material of re-refined oil through the oil filter and internal oil lubrication distribution passage system, to recirculate the flushing fluid within the internal oil lubrication distribution passage system, to withdraw the waste flushing fluid from the oil pan reservoir for disposal and storage in an external storage receptacle for storing both the expired oil and flushing fluid. An air purge connection is provided for evacuating fluid retained within the oil filter element and any fluid remaining in the internal oil lubrication distribution passage system into the oil pan reservoir prior to withdrawal of the fluid by the first pump. A second pump is provided for supplying fresh motor oil from an external storage receptacle through the oil filter and the internal oil lubrication distribution passage system. Optionally, a remote oil filter and drain mounting bracket provdes a central, easily accessible location within the engine compartment for connection to the oil changing apparatus and for changing the oil filter element. A drain plug adapter is connectible to the oil pan reservoir to provide connection to the first pump. Methods for removing waste or spent fluid and introducing fresh fluid through the oil filter element and internal oil lubrication distribution passage system, and for introducing, recirculating and removing flushing fluid from the internal oil lubrication distribution passage system are also disclosed.

18 Claims, 3 Drawing Sheets

INTEGRATED METHOD FOR CLEANING AND FLUSHING AN INTERNAL COMBUSTION ENGINE

This is a continuation-in-part of application Ser. No. 07/516,243, filed on Apr. 27, 1990 now U.S. Pat. No. 5,062,398.

FIELD OF THE INVENTION

The invention relates to an apparatus and method for changing motor oil in an internal combustion engine having an oil pan or similar oil reservoir. Such reservoirs can be found in automobiles, trucks, tractors, heavy earth moving equipment, military equipment, or the like. More particularly, this invention relates to methods in which spent or dirty oil is expediently removed from the oil pan, the lubrication passages thereafter flushed with flushing fluid to remove contaminants, and then the lubrication system is refilled through the oil filter and lubrication passages with fresh motor oil.

BACKGROUND OF THE INVENTION

The benefits of routine oil changes in an internal combustion engine are well known. Routine oil changes have been shown to increase engine life and performance. With repeated prolonged use, motor oil builds up suspended particles, metallic and non-metallic, from the abrasive and adhesive wear of engine parts against one another and from products of incomplete combustion and improper air intake. The particles in turn cause abrasive wear of the engine bearings, piston rings and other moving parts and the reduction of the motor oil lubricity as various additives and lubricating components become depleted. This adversely affects engine performance and if left unchanged can destroy or cripple the engine performance.

It is recommended by at least one oil manufacturer that the level of total solid concentration be limited to levels below 3.0% with levels of silica being present in amounts lower than 25 parts per million and sodium in amounts lower than 200 parts per million. To obtain satisfactory engine performance, and maintain solids concentration levels in the motor oil lower than the recommended 3.0%, changing the motor oil in an internal combustion engine is a necessary, but an undesirable, dirty and time-consuming task.

In currently designed vehicles, the oil pan serves the purpose of a reservoir for circulation of engine oil. Engine lubrication is generally accomplished through a gear-type pump. The pump picks up engine oil from the oil pan sump, where oil is drawn up through the pick-up screen and tube, and passed through the pump to the oil filter. The oil filter is generally a full flow paper element unit.

In some vehicles, an oil filter bypass is used to insure adequate oil supply, should the filter become plugged or develop excessive pressure drop. Oil is routed from the filter to the main oil gallery. The oil gallery supplies valve train components with oil, and by means of intersecting passages, supplies oil to the cam shaft bearings. Oil draining back from the rocker arms is directed, by cast dams in the crank case casting, to supply the cam shaft lobes. Oil also drains past specific hydraulic lifter flats to oil cam shaft lobes directly.

The passages supplying oil to the cam shaft bearings also supply the crank shaft main bearings through intersecting passages. Oil from the crank shaft main bearings is supplied to the connecting rod bearings by means of intersecting passages in the crank shaft. The front cam bearing can include a slot on its outside diameter to supply oil to the cam sprocket thrust face. In some engines, many internal engine parts have no direct oil feed and are supplied either by gravity or splash from other direct feed components. A bypass valve can also be disposed in the oil pick-up screen to insure adequate oil flow if the screen should become restricted. A pressure regulator valve, sometimes located in the oil pump body, maintains adequate pressure for the lubrication system and bypasses any excess back to the suction side of the pump. Oil from the pump passes through the filter before going to the engine oil galleries. In the filter, the oil passes through a filtering element where dirt and foreign particles are removed.

To remove the contaminated oil, the drain plug, generally located in the lowermost region of the oil pan, is opened. The spent oil containing suspended particles is permitted to flow under gravity out of the pan into a suitable receptacle. After the spent oil is removed, the plug is replaced and fresh oil is added to the engine usually through a separate opening in the engine valve cover. The process of gravity drainage does not remove all of the spent oil with its metallic and non-metallic particles which stick to the oil pan container walls, as well as engine components such as the crank shaft, connecting rods, pistons and the like which are exposed to the motor oil spray lubrication. These particles remain to be mixed with fresh motor oil. Thus the concentration of contaminants is lowered by dilution and only a part of the total contaminates are actually eliminated.

The oil change process is essentially the same whether performed at home, at service stations or at one of the various oil change centers which have opened in recent years. The flow rate, or time required for oil drainage, is the same for each of these locations, because it is limited by the size of the drain plug aperture and the force of gravity. Service stations and other locations simplify the process of oil drainage with the use of hydraulic racks, special oil collection receptacles and the like.

However, this specialized and expensive equipment is not readily available to the typical automotive owner who may wish to change the oil in his vehicle. It has been estimated that the retail market of oil is approximately 2.83 billion quarts or approximately 700 million gallons. The do-it-yourself individual has been found to be price sensitive, and tends to distrust the quality of service stations and other oil change centers. The do-it-yourself individual typically believes that if you want a job done right, you do it yourself. However, the current design of vehicles does not lend itself to do-it-yourself oil changes in a convenient clean and effortless manner. Many vehicles have low ground clearance making it difficult to access the oil drain plug for removal of the spent oil, and also making it difficult to collect the oil without contaminating the surrounding environment.

Environmental protection is a prominent social issue in our present society. Therefore, it would be desirable to encourage do-it-yourself oil changers to perform this type of task in an environmentally safe manner. It is estimated that there are approximately 119 million privately owned passenger vehicles. These vehicles require approximately 360 million oil changes a year, using an average of 1.2 gallons per change based on an average oil change frequency of 2.94 times a year. This amounts to approximately 550 million gallons of motor oil a year. Of this amount, it is estimated that 70% of motor oil is installed by motorists themselves.

It is believed that pursuant to present practice, the spent oil drained by motorists finds its way into spent household containers, such as milk cartons. The household containers are closed and disposed of in the garbage which can and will finally find its way into the local waste dump. As the household container deteriorates, the oil and its contaminates will eventually seep into the surrounding ground water below the dump site. It has been estimated that 300 million gallons of oil a year seeps into U.S. soil creating serious potential ground water pollution problems. It would be desirable environmentally and economically if this oil could be collected and recycled. In order to motivate the do-it-yourself market, it is desirable in the present invention to make the collection of oil during oil changes effortless, clean and inexpensive.

Conservation of energy and the trade deficit are also major issues in today's society. It is estimated that 250-360 million gallons of spent oil can now be easily collected and profitably recycled for re-refining. The price of spent oil so collected is four dollars per barrel at best, while the price of crude oil is much greater at approximately $18.00 per barrel. Recycling easily collected spent oil could decrease the trade deficit by approximately 120 million dollars, while providing a profitable recycling economy of approximately 86 million dollars per year.

Therefore, it would be desirable to provide a method which accelerates removal of spent oil completely and easily from the crank case. It would also be desirable to provide a system which reduces the amount of spent oil handling as required in the conventional oil change service station. Further, it would be desirable to provide a system which uses re-refined oil combined with a detergent for its flushing agent during cleansing of the engine prior to refilling the lubrication system. Finally, it is desirable to provide a method which could be easily employed by all vehicle owners at a convenient location with all the benefits of the method of the present invention such as time savings, money savings, convenience, minimum exposure to motor oil, environmental protection, energy conservation, trade deficit reduction, and finally longer lasting, better performing engines.

SUMMARY OF THE INVENTION

The present invention includes an apparatus external and separable from the internal combustion engine. The external device would be operably connectible to fresh oil storage means, flushing fluid storage means and waste storage means for both the spent oil and flushing fluid. The external apparatus preferably includes air purge introduction means for purging fluid retained with the oil filter element and any fluid remaining in the lubrication system passages of the internal combustion engine, such that all waste fluid can be deposited within the oil pan reservoir prior to evacuation of the waste fluid by suitable pump means. The pump means of the external apparatus draws waste fluid from the oil pan reservoir for deposit in the appropriate waste storage means. In addition, the pump means is connectible to an optional flushing fluid reservoir for pressurized delivery of flushing fluid through the pump means, oil filter element, and lubrication system passages of the internal combustion engine. Furthermore, suitable valve connections are provided for drawing flushing fluid formed of a base material of re-refined oil from the oil pan reservoir for recirculation through the pump means, external filtering means, and for pressurized delivery to the oil filter element of the internal combustion engine and thereafter flowing through the lubrication system passages of the internal combustion engine before re-accumulating in the oil pan reservoir for subsequent recirculation as desired.

Upon completion of the optional flushing cycle, the valves can be operated to draw the flushing fluid from the oil pan reservoir through the pump means for deposit in the same external waste storage means as the spent oil. After evacuation of the flushing fluid, the pump means can be connected to the fresh oil storage means for pressurized delivery of fresh motor oil through the oil filter element and lubrication system passages of the internal combustion engine until the appropriate amount of fresh motor oil has been delivered to the internal combustion engine.

The present invention also includes engine and engine compartment mounted adapters. One such adapter is an oil filter mounting adapter typically installed on the engine block, where the oil filter would normally be disposed, to allow relocation of the oil filter assembly to a more convenient location. The oil filter mounting adapter provides passages with external openings adapted to receive hose connections. The hose connections allow oil filter relocation to a convenient position within the engine compartment, if necessary.

A second adapter of the present invention is a remote oil filter base with mounting bracket. The remote oil filter base is adapted to receive an oil filter element and includes internal passages with external openings adapted to receive the hose connections from the oil filter mounting adapter. The base preferably includes a mounting bracket adapted to be mounted in any convenient location within the engine compartment. Preferably, this location is chosen, such that the oil filter is readily accessible for ease of replacement during oil changing operations. In addition, in its preferred form, the remote oil filter base includes additional internal passages and external openings adapted to receive hose connections and/or quick connect couplings for connection to the external apparatus portion of the present invention. As a further option, the remote oil filter base can also include an internal passage and external openings to centrally locate all the points of coupling to the external apparatus of the present invention, including a hose connection in fluid communication with a drain plug adapter, which will be described in greater detail below.

A third adapter of the present invention is a drain plug adapter. The drain plug adapter is in fluid communication with the lowermost portion of the oil pan reservoir and includes internal passages and external openings adapted to receive a hose connection. The drain plug adapter is connectible to the drain plug aperture in the lowermost region of the oil pan reservoir and includes two external apertures interconnected with one another. One external aperture can receive the original drain plug of the internal combustion engine or other suitable drain plug, while the other external aperture is adapted to receive a hose connection leading to the remote oil filter base.

In operation, the present invention provides a method for quickly and efficiently removing waste oil from an internal combustion engine, replenishing the lubrication system of an internal combustion engine with fresh oil, and prior to replenishing the engine with fresh oil, flushing the lubrication system, including the internal passages of the engine, with a flushing fluid to remove contaminants thereby providing a cleaner environment for the fresh oil to be introduced in the engine.

Additionally, the present invention provides purging of fluid from the oil filter element of the internal combustion engine with pressurized air means. Furthermore, all fluid introduced into the internal combustion engine first flows through the oil filter element of the internal combustion engine and then passes through the lubrication passages within the internal combustion engine prior to accumulating within the oil pan reservoir of the internal combustion engine. This provides expedient and efficient means for purging fluid from the oil filter element, flushing contaminants from the internal passages of the lubrication system during the flushing cycle, and prelubricating the lubrication system of internal passages within the internal combustion engine and recharging the oil filter with fresh oil during the fresh oil introduction phase.

Other modifications, characteristics, features and benefits of the present invention will become apparent upon reading the following detailed description of the invention in conjunction with the attached drawings.

BRIEF DESCRIPTION OF THE DRAWINGS

In the following drawings, like reference numerals refer to like parts throughout the various views, wherein.

DETAILED DESCRIPTION OF THE PREFERRED EMBODIMENT

Figure 1:
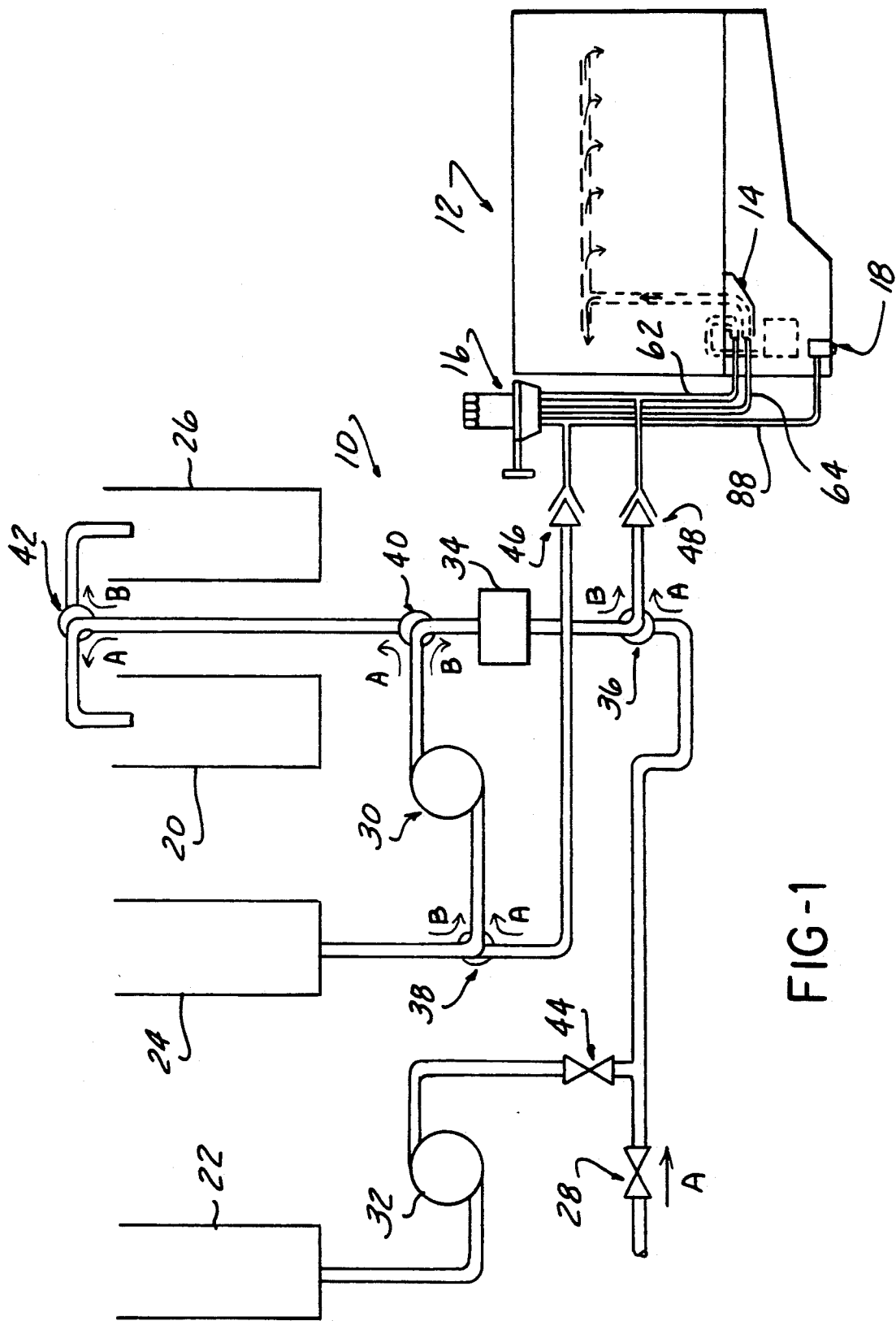
FIG. 1 is a schematic view of an oil change apparatus according to the present invention.

The basic process of the present invention can be employed successfully with internal combustion engines having oil reservoirs and internal oil lubrication distribution passage systems. The term "internal oil lubrication distribution passage system" is defined as, but not limited to, the machined passages and circulation systems present in the engine block, cylinder head, crank shaft, cam shaft and connecting rods. Various engines will have differing lubrication requirements, and therefore, it is to be understood that every engine may not have the passages and circulation systems in all the enumerated components.

The present invention includes an oil changing apparatus, generally designated as 10, which is separable from an internal combustion engine generally designated as 12. The external, separable oil change apparatus can be seen schematically on the left hand side of FIG. 1, while the internal combustion engine 12 is shown schematically on the right hand side of FIG. 1.

As will be described in greater detail below, the present invention may include one or more adapters connected to the internal combustion engine 12 to facilitate proper connection of the external oil changing apparatus 10 to the lubrication system of the internal combustion engine 12. The one or more adapters may include an oil filter mounting adapter 14, a remote oil filter and drain mounting bracket 16 and a drain plug adapter 18. One or more of these adapters may be required to modify existing internal combustion engines for use with the oil changing apparatus of the present invention. However, it is envisioned that at some point in time manufacturers may modify the configuration of internal combustion engines to provide the appropriate coupling connections as required for the present invention as original equipment manufacturer's optional or standard equipment. Therefore, in its broadest sense, the present invention does not require the adapters disclosed in this application, but rather only requires a coupling connection in fluid communication with the lowermost portion of the oil pan reservoir and a second coupling connection in fluid communication with the internal oil lubrication distribution passage system, preferably between the oil pump and the oil filter element. It is also preferable that the coupling connections be provided with quick connect couplings as is conventional and known in the art.

Referring now to FIG. 1, the oil changing apparatus 10 of the present invention is connectible to a plurality of external storage means. The storage means may include a waste oil and flushing fluid storage receptacle 20 and a fresh motor oil supply receptacle 22. A storage means also includes a flushing fluid supply receptacle 24.

The oil changing apparatus 10 also includes a connection to a source of compressed air (not shown). The connection to the source of compressed air is controlled by appropriate valve means 28, for opening and closing the communication of the compressed air with the oil changing apparatus 10. Of course, it is recognized that the pressure at which the compressed air is supplied through the oil changing apparatus must be controlled so that excessive pressure is not delivered to the internal oil lubrication distribution passage system of the internal combustion engine. It should be recognized that the appropriate control circuitry for regulating the pressure of the compressed air is well known to those skilled in the art of compressed air delivery systems and is commercially available. It should also be noted that the compressed air delivered to the internal oil lubrication distribution passage system should be appropriately dried so that minimum water vapor is introduced into the internal oil lubrication distribution passage system which could thereby cause problems with rust and degradation of the oil to be introduced into the internal oil lubrication distribution passage system of the internal combustion engine.

The oil changing apparatus 10 also includes pump means for evacuating fluid from the internal combustion engine and for introducing fluid into the internal oil lubrication distribution passage system of the internal combustion engine. The pump means may also be used for recirculating fluid within the internal combustion engine by drawing fluid from the internal combustion engine fluid reservoir and discharging that fluid through the pump means into the internal oil lubrication distribution passage system.

As depicted schematically in FIG. 1, the pump means may include a first pump 30 for drawing spent oil from the oil reservoir of the internal combustion engine 12 for discharge into the waste oil storage means 20. The pump means may also include a second pump 32 for introducing fresh motor oil from the fresh motor oil storage receptacle 22 into the internal oil lubrication distribution passage system of the internal combustion engine 12. Through appropriate valve means, the first pump 30 can be interconnected for supplying flushing fluid from a flushing fluid supply receptacle 24 into the internal oil lubrication distribution passage system, and once an appropriate amount of flushing fluid has been introduced into the internal combustion engine 12, the first pump 30 can be configured by the appropriate valve means for recirculating the flushing fluid from the internal combustion engine reservoir through the internal oil lubrication distribution passage system. In addition, through the appropriate setting of the valve means, the first pump 30 can be configured to draw the spent flushing fluid from the reservoir of the internal combustion engine 12 for discharge into the waste oil storage means 20.

When recirculated flushing fluid operations are desired, it is preferable to include a filter unit 34 on the discharge side of pump 30 to filter fluid being recycled back into the internal oil lubrication distribution passage system of the internal distribution engine 12 to remove suspended particles being carried in the flushing fluid stream prior to reentering the internal combustion engine. The external filter 34 may be sized appropriately for the internal combustion engine being flushed, for example it may be desirable in automotive internal combustion engines to remove particles having a size equal to or greater than 5 microns. However, it should be recognized that the filtration characteristics of the filter 34 can be modified to the extent desired by the operator without adversely effecting the operation of the oil changing apparatus 10 of the present invention. It should also be recognized that through appropriate valve and fluid conduit means arrangements, the present invention can be modified to operate with only one pump, rather than a two pump configuration as schematically shown in FIG. 1. However, the two pump configuration is the preferred configuration of the present invention since it isolates the fresh motor oil from the major portion of the fluid passage conduits used for removal of the waste oil and flushing fluid introduction and recycling portions of the oil change apparatus 10.

The valve means can include a plurality of directional flow control valves. As shown in FIG. 1, the directional flow control valves are designated 36, 38, 40 and 42. Each of these directional flow control valves is operable to divert flow from a first direction indicated by arrow A to a second direction indicated by arrow B.

In operation, the internal combustion engine 12 is brought into proximity with the oil changing apparatus 10. A fluid conduit hose with a first quick connect coupling 46 is connected to the appropriate outlet connection of the internal combustion engine 12 for drawing fluid from the reservoir of the internal combustion engine 12. Another hose with a second quick connect coupling 48 is connected to the appropriate connection of the internal combustion engine 12 for introducing fluid into the internal combustion engine 12 through the filter element and the internal oil lubrication distribution passage system of the internal combustion engine 12 for subsequent accumulation in the oil pan reservoir of the internal combustion engine 12.

Directional flow control valve 36 is actuated to provide flow in the arrow A direction and valve means 28 is actuated to introduce pressurized air into the system to purge fluid from the oil filter element thereby causing the residual spent oil retained within the filter element to be discharged through the internal oil lubrication distribution passage system to the oil pan reservoir of the internal combustion engine 12. The check valve 44 prevents pressurized air from entering the second pump 32 and the fresh oil supply receptacle 22.

After completing the purging operation, control valve 28 is de-activated or closed to stop delivery of the compressed air. Directional flow control valve 38 is then operated to provide flow in the arrow A direction. Directional flow control valve 40 is also actuated to provide flow of fluid in the arrow A direction. In addition, directional flow control valve 42 is actuated to provide flow in the arrow A direction.

Pump 30 is then energized to draw fluid from the oil pan reservoir of the internal combustion engine 12 for discharge into the spent oil storage receptacle 20. After the oil pan reservoir of the internal combustion engine 12 has been emptied, the pump 30 is de-energized.

Flushing of the internal oil lubrication distribution passage system occurs after removal of the spent oil from the internal combustion engine and prior to optional replacement of the old filter element with a new filter element. After removal of the spent oil from the internal combustion engine 12, the oil changing apparatus 10 is reconfigured using the valve means to introduce flushing fluid into the internal oil lubrication distribution passage system. Directional flow control valve 36 is operated to provide flow in the direction of arrow B. Directional flow control valve 38 is also operated to provide flow in the direction of arrow B. In addition, directional flow control valve 40 is actuated to provide flow in the direction of arrow B. This provides fluid passage means for pump 30 to draw flushing fluid from receptacle 24 for delivery to the internal oil lubrication distribution passage system.

Once an appropriate amount of flushing fluid has been introduced into the internal combustion engine 12, pump 30 is deenergized temporarily to reconfigure the valves. The flushing fluid disposed within the internal combustion engine 12 can then be recirculated through the internal oil lubrication distribution passage system by operating directional flow control valve 38 to provide for flow in the direction of arrow A. This provides a closed loop recycling system for flushing the internal oil lubrication distribution passage system of the internal combustion engine 12 for as long as is deemed necessary by the oil changing apparatus operator.

Preferably, as previously mentioned, an external filter 34 is provided in the recirculating line to remove particles and other contaminants flushed from the internal oil lubrication distribution passage system of the internal combustion engine 12. However, it should be recognized that this is an additional precaution, since the recirculating flushing fluid is delivered from the pump 30 through the oil filter element of the internal combustion engine 12. Therefore, the filter element of the internal combustion engine 12 would remove a portion, if not all, of the contaminants passing therethrough prior to re-entering the internal oil lubrication distribution passage system. For this reason, it is preferable to replace the old filter element of the internal combustion engine 12 after the flushing operations have been completed. When it is determined by the system operator that the flushing operation has continued for a sufficient period of time to clean the internal oil lubrication distribution passage system to the degree desired, the pump 30 is de-energized temporarily while reconfiguring the valve means.

In order to evacuate the spent flushing fluid from the oil pan reservoir of the internal combustion engine 12, valve 36 is operated to provide for a flow in the direction of arrow A. Valve 40 is also operated to provide for flow in the direction of 10 arrow A. Valve means 28 is then actuated to supply pressurized air for purging fluid from the filter element of the internal combustion engine 12. Fluid is forced out of the filter element by the compressed air and passes through the internal oil lubrication distribution passage system of the internal combustion engine 12 prior to being deposited in the oil pan reservoir of the internal combustion engine 12.

After completing the purging operation, valve means 28 is actuated to close off the supply of compressed air to the oil changing apparatus 10. Pump 30 is then energized to draw fluid from the oil pan reservoir of the internal combustion engine 12 for discharge into the waste oil and flushing fluid storage receptacle 20 through connector means 42.

The filter element of the internal combustion engine 12 can then be removed and replaced with a clean filter element after the flushing cycle. Fresh oil can then be introduced into the internal oil lubrication distribution passage system by actuating directional flow control valve 36 to allow flow in the arrow A direction if required. Pump 32 is then energized to draw fresh motor oil from receptacle 22 for discharge into the internal combustion engine 12 through the oil filter element and internal oil lubrication distribution passage system for accumulation in the oil pan reservoir of the internal combustion engine 12.

When an adequate amount of fresh motor oil has been delivered to the internal combustion engine 12 by the pump 32, the pump 32 is de-energized. The quick disconnect couplings 46 and 48 are then disconnected from the internal combustion engine 12. The internal combustion engine 12 is now ready for normal use with the oil filter element being precharged with fresh oil and engine components prelubricated prior to starting the engine. If desired, the system is configured to permit draining and purging to be done concurrently.

The flushing fluid introduced is preferably composed of a base material of re-refined motor oil which is miscible with a suitable detergent having strong cleaning characteristics. Rerefined motor oil is recycled oil that has been refined. This process includes vacuum distillation, centrifugal separation of the waste oil from the refined oil and, finally, bleaching of the refined oil prior to use. The advantage of using re-refined motor oil as a flushing fluid is that any fluid remaining in the system prior to refilling with fresh motor oil will not damage the oil pan, gaskets, and associated engine components. It is also preferable that the flushing fluid provide sufficient lubricity or sheeting action to enhance the sheeting action of the flushing fluid dislodging particulate contaminants and carrying them with the flushing fluid as it flows under gravity back to the oil pan. The flushing fluid employed is, therefore, one which is compatible with engine oil and is not detrimental in any subsequent waste oil recycling processes and one which does not deposit undesirable residual constituents which adhere to oil pan surfaces and engine components.

The detergent employed in the flushing fluid is, preferably, in an amount sufficient to provide lubricity and sheeting action to the flushing fluid. In including the lubricating additive in the flushing fluid of the present invention, it is believed that the lubricating additive would impart characteristics which would increase the sheeting action and cleaning characteristics of the flushing fluid.

While a certain amount of residual spent oil and contaminants are removed merely by the mechanical scrubbing action of the circulated flushing fluid, additional amounts can be dissolved or removed due to the sheeting action of the flushing fluid as it trickles down the engine components to the oil pan reservoir, and due to the chemical interaction between the residual spent oil and the re-refined oil and detergent composing the flushing fluid.

Figure 2:
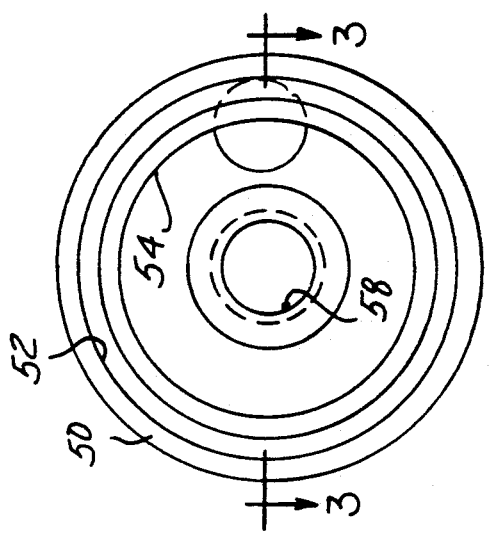
FIG. 2 is a top view of an oil filter mounting adapter according to the present invention.
Figure 3:
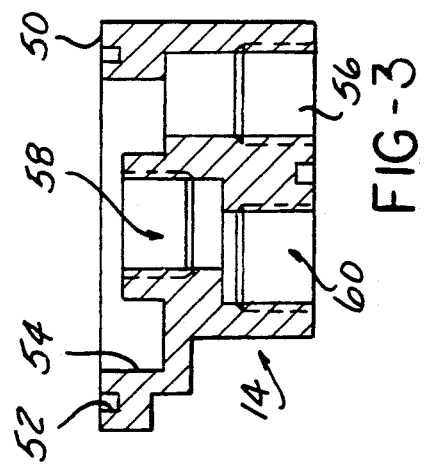
FIG. 3 is a cross-sectional view of the oil filter mounting adapter taken as shown in FIG. 2.
Figure 5:
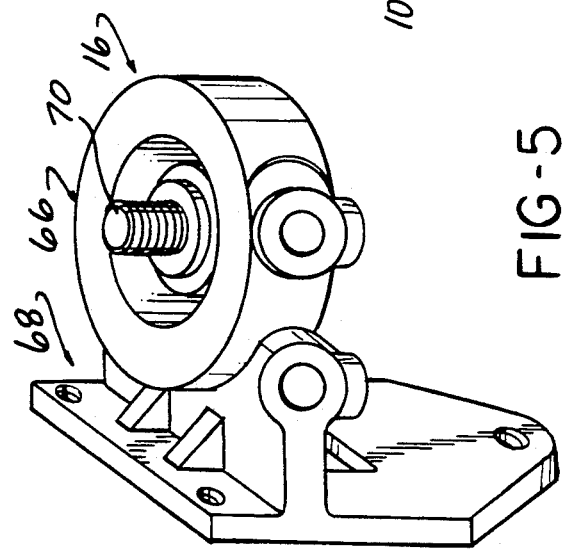
FIG. 5 is a perspective view of a remote oil filter and drain mounting bracket according to the present invention.
Figure 4:
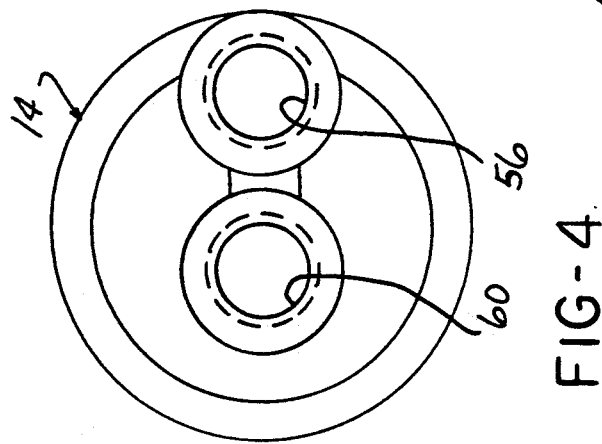
FIG. 4 is a bottom view of the oil filter mounting adapter according to the present invention.
Figure 6:
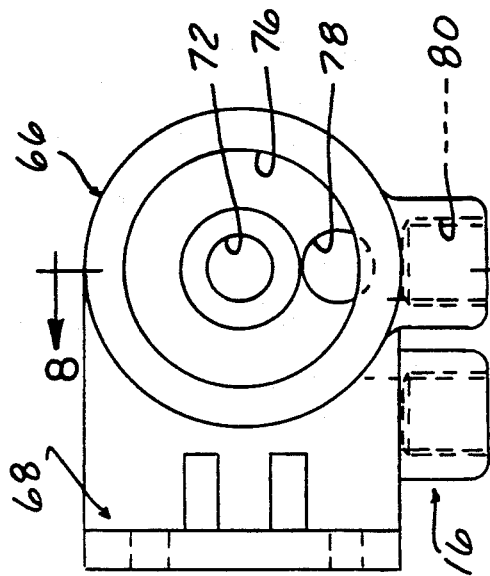
FIG. 6 is a top view of the remote oil filter and drain mounting bracket.
Figure 8:
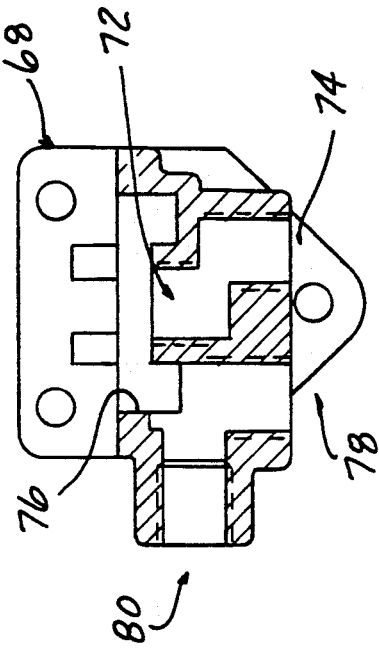
FIG. 8 is a cross-sectional view of the remote oil filter and drain mounting bracket taken as shown in FIG. 6.
Figure 7:
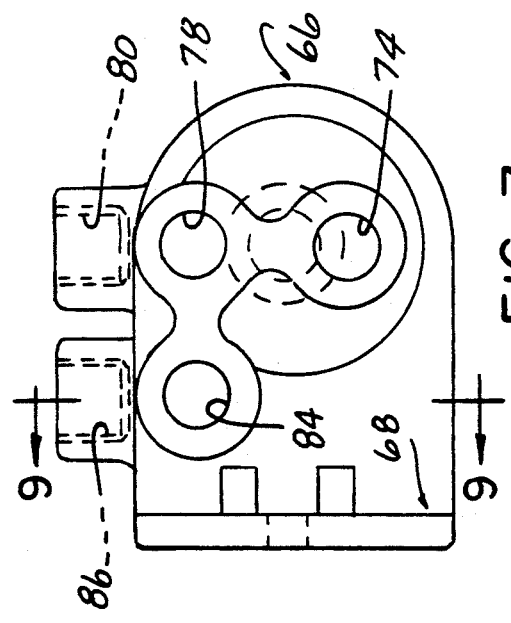
FIG. 7 is a bottom view of the remote oil filter and drain mounting bracket
Figure 9:
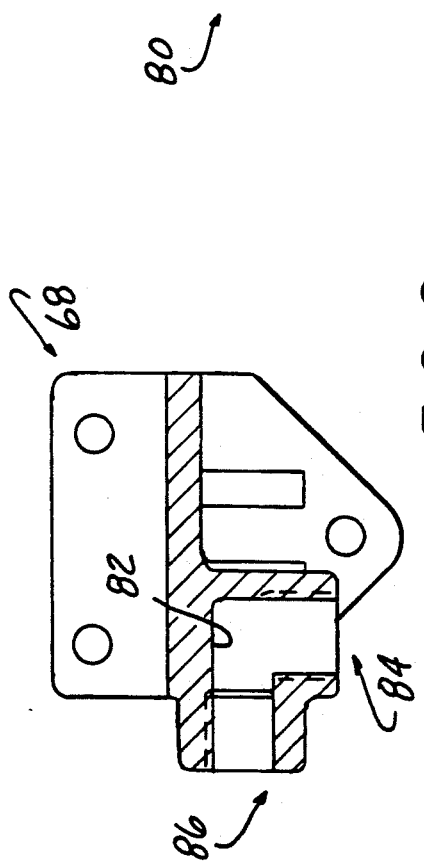
FIG. 9 is a cross-section view of the remote oil filter and drain mounting bracket taken as shown in FIG. 7.

An oil filter mounting adapter is shown in FIGS. 2-4. The oil filter mounting adapter 14 is commercially available and is generally referred to as a spin on type adapter. The oil filter mounting adapter 14 has a generally circular first face 50. The first face 50 includes an 0-ring groove 52 spaced inwardly from the outer periphery of the circular first face 50. Spaced inwardly from the 0-ring groove 52 is a first fluid passage 54. The first fluid passage is in communication with a first external outlet 56 adapted to receive a hose connection fitting for attachment to a first hose 62.

An internally threaded second fluid passage 58 is disposed generally in the center of the circular first face 50. The interior threads of the second fluid passage 58 permit the oil filter mounting adapter 14 to be threadingly engaged with the oil filter mounting boss normally located on the engine block of an internal combustion engine 12. The second fluid passage 58 is in fluid communication with a second external outlet 60. The second external outlet 60 is adapted to receive a hose connection fitting for engagement with a second hose 64. The oil filter mounting adapter 14 and associated hoses permit relocation of the oil filter to a more convenient location within the engine compartment. Fluid is generally delivered from the oil pump within the internal combustion engine through the first fluid passage 54 and associated hose to the oil filter element. After passing through the oil filter element, fluid is returned to the internal combustion engine through the second fluid passage 58 and its associated hose.

A remote oil filter and drain mounting bracket 16 is shown in detail in FIGS. 5-9. The remote mounting bracket 16 includes a filter mount portion 66 and a support bracket portion 68. The filter mount portion 66 includes a threaded nipple 70 for spinning on the filter element. The threaded nipple 70 is in fluid communication with a generally centrally disposed fluid passage 72 having a threaded external opening 74 adapted to receive a hose connection fitting for attachment to second hose 64.

Disposed around threaded nipple 70 is an annular fluid passage groove 76 in fluid communication with a threaded external opening 78 adapted to receive a hose connection fitting for attachment to first hose 62. First hose 62 is also in fluid communication with a quick connect coupling for attachment to the external oil changing apparatus 10 of the present invention. The fluid connection to the first hose 62 can be made anywhere along the length of the fluid passage between the remote mounting bracket and the engine block, however, the preferred embodiment of the present invention provides a second external opening 80 in fluid communication with the annular fluid passage groove 76 of the remote mounting bracket 16.

The second external opening 80 is adapted to receive a portion of the quick connect coupling which can be mounted on the remote mounting bracket providing a conveniently located support for connection to the external oil changing apparatus 10. It should be apparent that the second external opening 80 must be adequately sealed during operation of the internal combustion engine 12. It is envisioned that the quick coupling connection attached to the second external opening 80 would be of the self-sealing type, such that when the separable external oil changing apparatus 10 is not connected to the internal combustion engine 12, the portion of the quick coupling connection attached to the external opening 80 would be self-sealed, or in the alternative could be provided with an appropriate sealing end cap or plug.

Optionally, the filter mount portion 66 of the remote mounting bracket 16 can also include a third fluid passage 82 with first and second external openings 84 and 86 respectively. The first external opening 84 of the third fluid passage 82 is adapted to receive a hose connection fitting for connection to a third hose 88. The opposite end of the third hose 88 is connected to a drain plug adapter 18 which will be described in greater detail below.

The second external opening 86 of the third fluid passage 82 is adapted to receive a portion of a second quick connect coupling for attachment to the external oil changing apparatus 10. As previously described, the quick connect couplings 46 and 48 are known in the art and commercially available. Preferably, each quick connect coupling 46 and 48 is separable into two portions, one of which is permanently mounted in the engine compartment and preferably self-sealing. The other portion of the quick connect couplings 46 and 48 is connected to the hose lines extending from the external oil changing apparatus 10 providing connections between the apparatus 10 and the internal combustion engine 12. This configuration of the remote mounting bracket 16 is the preferred embodiment, since it provides a central location for all connections to the external oil changing apparatus 10 and also supports the filter element in the same central location in a readily accessible position for easy replacement.

It should be recognized however that the present invention also includes within its scope separate remote mounting brackets one for mounting the oil filter and another one for supporting the quick connect couplings at a location spaced from the oil filter, if desired or necessary within the particular engine compartment being modified. In this particular instance, the external openings 80 and 86 could be adapted to receive hose connection fittings for attachment to the remote quick coupling connection mounting bracket. In addition, it should be recognized that the third hose 88 could be led directly to the remote quick coupling mounting bracket without passing through the remote mounting bracket of the oil filter. Furthermore, as previously mentioned, the fluid connection to the first hose 62 can be made anywhere along the fluid passage between the oil filter mounting adapter and the remote oil filter mounting bracket and can lead directly to the remote quick coupling connection bracket.

Figure 10:
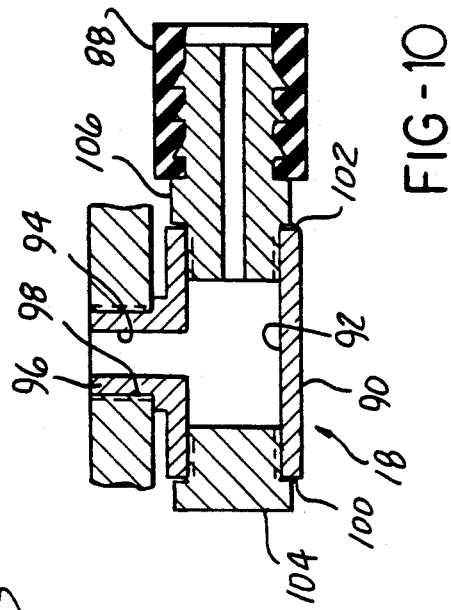
FIG. 10 is a cross-section view of a drain plug adapter according to the present invention.

A drain plug adapter 18 is shown in FIG. 10. The drain plug adapter 18 includes a body member 90 having a central through bore 92 extending therethrough and a branch through bore 94 which is in fluid communication with central through bore 92 and is angularly orientated thereto. Branch through bore 94 may have an externally threaded male first end 96 adapted to matingly engage within the internally threaded female aperture 98 formed in the bottom of the oil pan reservoir of the internal combustion engine 12.

In the alternative, an internally threaded end of branch bore 94 may be adapted to receive a portion of an externally threaded male connecting member therein. The connecting member may include a first externally threaded region adapted to be threadingly received in the internally threaded end of branch bore 94 and a second externally threaded region adapted to be threadingly received in the drain plug opening 98 of the oil pan reservoir of the internal combustion engine 12. To facilitate attachment of the drain plug adapter 18 in the drain plug opening 98, the connecting member may have a centrally positioned square or hexagonal shaped portion adapted to be engaged by known tools for turning the connecting member to threadingly engage within the aperture 98 of the oil pan reservoir and branch through bore 94 of the drain plug adapter 18. The connecting member, of course, would have a through bore longitudinally extending therethrough to bring the oil pan interior into fluid communication with the branch through bore 94 and the central through bore 92.

The central through bore 92 of the drain plug adapter 18 has first and second ends, 100 and 102 respectively. One end of the central through bore is adapted to receive a drain plug 104. The other end of the central through bore is adapted to receive a hose connection fitting 106. Preferably, the hose connection fitting 106 is a push-on type hose connection fitting adapted to sealingly engage an end section of hose without requiring the use of hose clamps, as is commercially available and known in the hose connecting art. The third hose 88 is attached to the drain plug adapter 18 at the outlet of central through bore 92.

While the invention has been described in detail, it will be apparent to those skilled in the art that the disclosed invention may be modified. Therefore, the foregoing description is to be considered exemplary, rather than limiting and the true scope of the invention is that defined in the following claims.

I claim:

1. An integrated method for changing oil in and cleaning interior passages and components of an internal combustion engine having an internal oil lubrication distribution passage system, an oil filter and an oil reservoir, the method comprising the steps of:
   removing waste oil from the oil reservoir into a suitable waste oil storage receptacle exterior to the internal combustion engine;
   introducing a flushing fluid into the oil reservoir by passing said flushing fluid through the oil filter and then through the internal oil distribution passage system into the oil reservoir, said flushing fluid consists essentially of re-refined motor oil and a detergent present in an amount sufficient to provide lubricity and sheeting action to said flushing fluid;

removing said introduced from the internal combustion engine into a suitable waste flushing fluid storage receptacle exterior to the internal combustion engine; and introducing fresh engine oil into the internal combustion engine.

2. The method of claim 1 further comprising the step of:

placing an external separable apparatus into fluid contact with the internal oil lubrication passage system at a first point upstream of the oil filter, and at a second point downstream of and in fluid communication with said oil reservoir, the external, separable apparatus comprising:

a) said external waste oil storage receptacle;
b) said external waste flushing fluid storage receptacle;
c) means for conveying fluids from the internal combustion engine to said respective external waste storage receptacle;
d) a fresh flushing fluid storage receptacle;
e) a fresh engine oil storage receptacle;
f) conduits connecting said fresh flushing fluid storage receptacle and said fresh engine oil storage receptacle with the internal combustion engine; and
g) a pump located in said conduits intermediate between said fresh storage receptacles and the internal combustion engine in fluid communication with said fluid conveying means.

3. The method of claim 2 further comprising the step of:

evacuating engine waste oil from said oil filter into said oil reservoir.

4. The method of claim 3 further comprising the step of:

blowing pressurized gas through said oil filter and depositing excess oil into said oil reservoir.

5. The method of claim 4 further comprising the steps of:

removing said excess oil from the oil reservoir of the internal, combustion engine by activating said means for conveying fluids from the internal combustion engine of the separable, external apparatus; and depositing said excess oil in said external oil storage receptacle.

6. The method of claim 5 further comprising the steps of:

recirculating flushing fluid from the oil reservoir through the oil filter and internal oil lubrication distribution passage system by action of said pump of said external apparatus for an interval sufficient to remove contaminants located therein;

after said recirculation step, allowing said flushing fluid to collect in the oil reservoir; and removing said collected flushing fluid from the reservoir into said external waste flushing fluid storage receptacle through said fluid conveying means.

7. The method of claim 6 further comprising the step of:

replacing the filter of the internal combustion engine with a fresh oil filter before introducing fresh oil into the oil reservoir through said fresh oil filter.

8. The method of claim 6 further comprising the step of:

introducing fresh oil from said fresh engine oil storage receptacle serially through the oil filter and the internal oil lubrication distribution passage system into the oil reservoir by activation of said pump of said external apparatus.

9. The method of claim 2 wherein said external, separable apparatus further comprises:

means for controlling fluid communication between said external, separable apparatus and the internal oil lubrication distribution passage system of the internal combustion engine, said control means comprising a directional flow control valve for diverting fluid flow from a first direction to a second direction within the internal combustion engine.

10. An integrated method for changing oil and cleaning interior passages, surfaces and components in an internal combustion engine having an internal oil lubrication distribution passage system, an oil filter and an oil reservoir, the method comprising the step of:

continuously flushing the internal oil lubrication distribution passage system with a flushing fluid consisting essentially of clean engine oil while maintaining the internal combustion engine in a static state.

11. The method of claim 10 wherein said flushing fluid is introduced into the internal oil lubrication distribution passage system by means of an external, separable apparatus connected to said internal oil lubrication distribution passage system at a first point upstream of the oil filter, and at a second point in fluid communication with the oil reservoir.

12. The method of claim 11 wherein waste engine oil contained in the oil filter is evacuated into the oil reservoir and combined with waste engine oil contained therein and said combined waste engine oil is removed from the oil reservoir of the internal combustion engine by the activation of means for removing said combined waste engine oil located on the external apparatus prior to said continuous flushing step.

13. The method of claim 12 wherein said waste engine oil is evacuated from the oil filter and internal oil lubrication distribution passage system by blowing pressurized air through oil filter and depositing said waste oil into the oil reservoir.

14. The method of claim 11 wherein said introduced flushing fluid is allowed to recirculate from the oil reservoir through the oil filter and internal oil lubrication distribution passage system said recirculation effected by recirculating means located on said external apparatus.

15. The method of claim 14 further comprising the steps of:

removing flushing fluid from the oil reservoir through said external apparatus and into a suitable external waste storage receptacle;

replacing the filter element of the internal combustion engine with a clean filter element; and introducing fresh oil through said external apparatus into the oil reservoir by way of the said oil filter and internal lubrication distribution passage system.

16. The method of claim 10 wherein said flushing fluid consists essentially of motor oil and a detergent in an amount sufficient to provide lubricity and sheeting action to said flushing fluid.

17. The method of claim 16 further comprising the steps of:

introducing said flushing fluid into the internal oil lubrication distribution passage system at a first point upstream of the oil filter; and evacuating said introduced flushing fluid from said internal combustion engine at a point in fluid communication with the oil reservoir.

18. The method claim 17 further comprising the step of:

evacuating waste engine oil from the oil filter and internal oil lubrication distribution passage system by blowing pressurized air into the oil filter and the internal oil lubrication passage system prior to said flushing fluid introduction step.

* * * * *